United States Patent
Kelderman

(10) Patent No.: US 6,340,165 B1
(45) Date of Patent: Jan. 22, 2002

(54) TORSION AXLE AND AIR BAG VEHICLE SUSPENSION SYSTEM

(76) Inventor: Gary L. Kelderman, 2674 Hwy. 92, Oskaloosa, IA (US) 52577

( * ) Notice: Subject to any disclaimer, the term of this patent is extended or adjusted under 35 U.S.C. 154(b) by 0 days.

(21) Appl. No.: 09/377,414

(22) Filed: Aug. 20, 1999

(51) Int. Cl.[7] ............................................. B60G 3/99
(52) U.S. Cl. .......................................... 280/124.153
(58) Field of Search ................ 280/124.153, 124.162, 280/124.166, 124.169

(56) References Cited

U.S. PATENT DOCUMENTS

| | | | |
|---|---|---|---|
| 2,998,981 A | | 9/1961 | Derr .......................... 280/124 |
| 3,353,840 A | | 11/1967 | Love .......................... 280/124 |
| 3,784,221 A | | 1/1974 | Frasier .................... 280/124 F |
| 3,865,396 A | * | 2/1975 | Bates ..................... 280/124 R |
| 3,966,223 A | * | 6/1976 | Carr .......................... 280/712 |
| 4,262,929 A | * | 4/1981 | Pierce ........................ 280/713 |
| 4,518,171 A | * | 5/1985 | Hedenberg .................. 280/711 |
| 4,529,224 A | * | 7/1985 | Raidel ........................ 280/711 |
| 4,614,247 A | * | 9/1986 | Sullivan .................. 180/24.02 |
| 4,762,337 A | * | 8/1988 | Raidel ........................ 280/688 |
| 4,773,670 A | * | 9/1988 | Raidel, II .................. 280/688 |
| 4,934,733 A | | 6/1990 | Smith ......................... 280/711 |
| 5,016,912 A | | 5/1991 | Smith ......................... 280/711 |
| 5,037,126 A | | 8/1991 | Gottschalk .................. 280/688 |
| 5,088,758 A | | 2/1992 | Wall .......................... 280/683 |
| 5,161,814 A | | 11/1992 | Walker .................... 280/414.5 |
| 5,163,701 A | | 11/1992 | Cromley ..................... 280/700 |
| 5,255,936 A | * | 10/1993 | Velazquez ................... 280/717 |
| 5,275,430 A | | 1/1994 | Smith ......................... 280/711 |
| 5,366,237 A | | 11/1994 | Dilling ....................... 280/711 |
| 5,375,871 A | | 12/1994 | Mitchell ..................... 280/688 |
| 5,393,096 A | | 2/1995 | Pierce ........................ 280/788 |
| 5,411,286 A | | 5/1995 | Pittman ...................... 280/717 |
| 5,427,404 A | | 6/1995 | Stephens .................... 280/712 |
| 5,615,906 A | * | 4/1997 | Raidel, Sr. .................. 280/686 |
| 5,649,719 A | * | 7/1997 | Wallace et al. ............. 280/713 |
| 5,667,240 A | * | 9/1997 | Mitchell ..................... 280/712 |
| 5,746,441 A | | 5/1998 | VanDenberg ............... 280/713 |
| 5,788,263 A | | 8/1998 | VanDenberg ............... 280/688 |
| 5,924,712 A | * | 7/1999 | Pierce ................... 280/124.13 |
| 5,951,032 A | * | 9/1999 | Overby et al. ........ 280/124.116 |

OTHER PUBLICATIONS 1 page sheet from Internet—address http://www.fleetwood.com/rvs/avion98/torflex.num—entitled AVION by Fleetwood showing a Torflex Dexter Axle.
4 pages—p. 2, 5, 60 & 61 obtained from Internet address www.dexteraxle.com—p. 2 entitled General Applications; p. 5 entitled Torflex Application Information; pp. 60 & 61 entitled Torflex Axle Installation.
2 page document of a "Redneck Trailer Supplies" Torflex—Dexter Axle—Rubber Torsion Axles.

* cited by examiner

Primary Examiner—Eric Culbreth
Assistant Examiner—L. Lum
(74) Attorney, Agent, or Firm—Henderson & Sturm LLP

(57) ABSTRACT

A vehicle suspension system assembly for attachment to a vehicle frame having a torsion axle and at least two ground engaging wheels operatively rotatably attached to each respective end of the torsion axle has an attachment member which is adapted to be attached to the frame. An arm is operably pivotally attached to the attachment member along an axis. A torsion axle is received in a torsion axle receiving portion of the assembly at a first distance spaced from the aforementioned axis for selectively receiving the torsion axle. An air bag is operatively disposed between the frame and the arm, the air bag being spaced at a second distance from the axis. A linkage element of variable length, which can be a shock absorber, is operably attached to the frame and to the arm whereby the arm will be held at a predetermined position with respect to the frame and yet allow the arm to pivot about the axis. In a preferred embodiment, the air bag is spaced further away from the pivotal axis of the arm than is the torsion axle.

29 Claims, 4 Drawing Sheets

US 6,340,165 B1

TORSION AXLE AND AIR BAG VEHICLE SUSPENSION SYSTEM

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates to suspension systems for vehicles which include trailers as well as cars and trucks, and more particularly to a combination air bag and torsion axle suspension system.

2. Description of the Related Art

Torsion axles have been known for many years, for example as shown in U.S. Pat. Nos. 2,998,981 to Derr and 3,353,840 to Love. Torsion axles have proven to be extremely popular primarily because if one wheel hits a bump or rut, it can react independently of the other wheel, which may not have hit a bump or rut at the exact same time. This torsion axle concept therefore operates to keep a trailer or the like moving as straight as possible behind a towing vehicle and absorbs some of the shock of the road over which it is passing with an independent suspension. This can be contrasted with a straight axle situation where if one wheel were to drop into a rut or the like and be slowed down for that reason while the wheel on the other side of the trailer did not have the same experience at the same time, the trailer would tend to turn somewhat to allow the wheel that is on the flat part of the road to move forward while the wheel that is in the rut would be restrained, therefore causing the axle to be not perpendicular with the direction of towing of the vehicle itself, assuming in this example that the trailer was being towed on a straight portion of the road.

Besides the two aforementioned torsion axles which are constructed of a square axle in cross section with elongated rubber members all disposed within a larger tube, another patent, U.S. Pat. No. 5,161,814 to Walker, also discloses a newer patent using a similar construction. One of the most common and popular torsion axles is a TorFlex® rubber torsion suspension system by Dexter Axle. This last mentioned torsion axle has independent and separate stub axles on each side to enhance the independent aspect of such an axle.

Torsion axles can be constructed differently as evidenced by U.S. Pat. No. 5,163,701 to Cromley, Jr. which uses a plurality of elongated bars which can twist and bend but return to their original position after such bending. In contrast, it has been well known for many years to use air bags for straight, non-torsion axles, such as shown in U.S. Pat. Nos. 3,784,221 to Frasier and 5,427,404 to Stephens. While it is true that both the torsion axle technology and the air bag technology has been quite successful independently in making a smoother ride and enhanced the handling performances of vehicles having such suspension systems, these suspension systems still have their shortcomings and there is a need for improvement thereto.

BRIEF SUMMARY OF THE INVENTION

The present invention relates to a vehicle suspension system assembly for attachment to a vehicle frame having a torsion axle and at least two ground engaging wheels operatively rotatably attached to each respective end of the torsion axle. An attachment member is adapted to be attached to the frame and an arm is operably pivotally attached to the attachment member along an axis. A torsion axle is received in a torsion axle receiving portion of the assembly at a first distance spaced from the aforementioned axis for selectively receiving the torsion axle. An air bag is operatively disposed between the frame and the arm, the air bag being spaced at a second distance from the axis. A linkage element of variable length, which can be a shock absorber, is operably attached to the frame and to the arm whereby the arm will be biased to a predetermined position with respect to the frame and yet allow the arm to pivot about the axis. In a preferred embodiment, the air bag is spaced further away from the pivotal axis of the arm than is the torsion axle.

An object of the present invention is to provide an improved vehicle suspension system.

Another object of the present invention is to provide a combination air bag and torsion axle suspension system.

Other objects, advantages, and novel features of the present invention will become apparent from the following detailed description of the invention when considered in conjunction with the accompanying drawings.

DETAILED DESCRIPTION OF THE INVENTION

Figure 1:
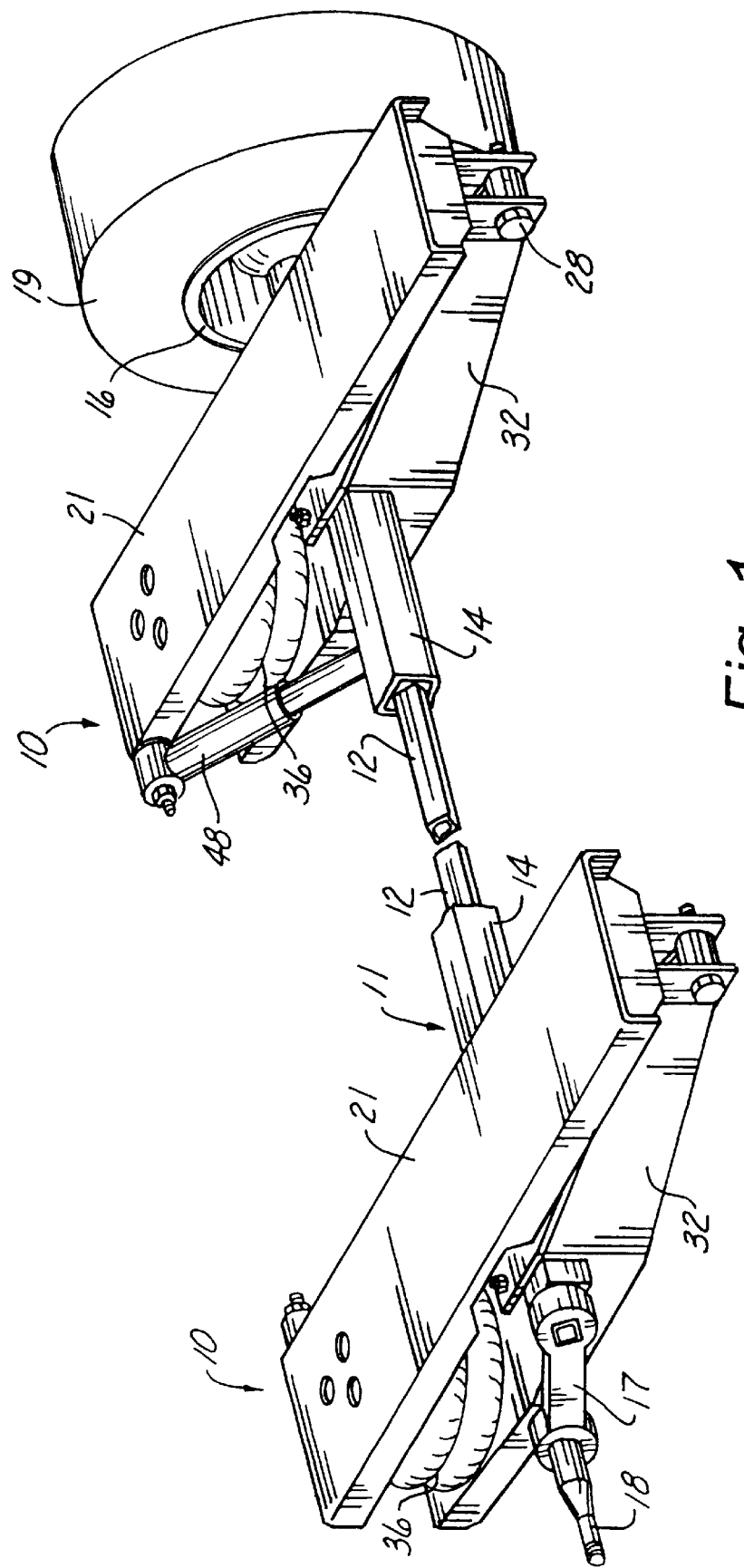
FIG. 1 is a perspective view of a preferred embodiment of the present suspension system with the frame removed so as to see the three sub-assemblies which are primarily two air bag assemblies with shock absorbers thereon adapted to receive a torsion axle sub-assembly.
Figure 3:
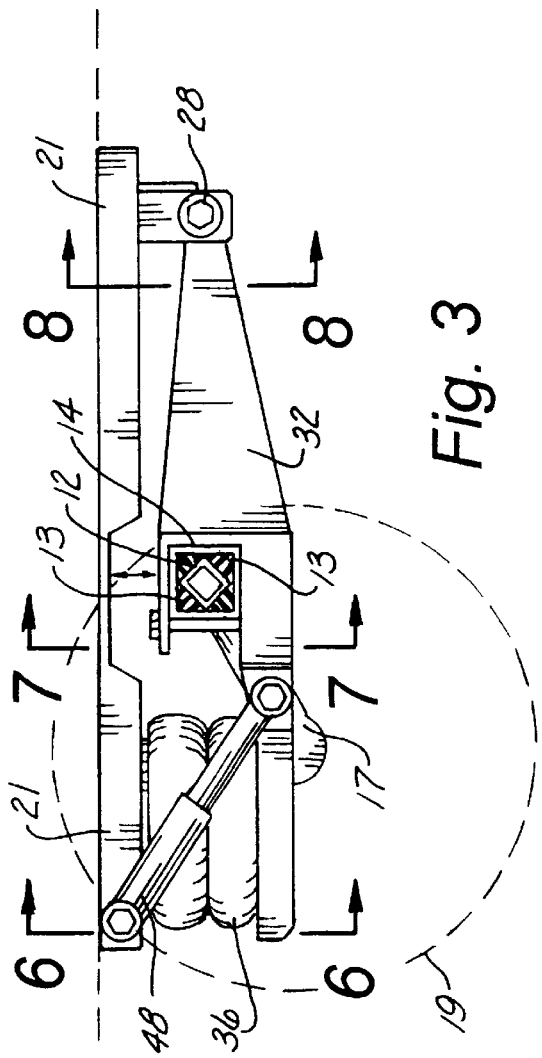
FIG. 3 is a side elevational view of the preferred embodiment of the present invention for example as shown from the left side of FIG. 2 is the device was assembled.

Referring now to the drawings, wherein like reference numerals designate identical or corresponding parts throughout the several views, FIG. 1 shows the present invention (10) connected to each end of a torsion axle (11). While other torsion axles can be used, the torsion axle (11) is preferably one similar to a TOR FLEX® brand torsion axle from Dexter Axle which has independent shafts (12) on each side which can move independently, i.e., the left torsion axle (12) can move independently of the right torsion axle (12). Referring to FIG. 3, the torsion axle (12) has a plurality of rubber cylindrical members (13) surrounding the stub axle (12) compressed between the stub axle (12) and what is normally a one-piece outer housing (14). As the wheels (16) encounter obstructions or irregularities on the road, shock is absorbed the stub shaft (12) can twist with crank arm (17) and the hub (18) shown in FIG. 1 to which the wheel (16) and tire (19) are rotatably attached.

Figure 4:
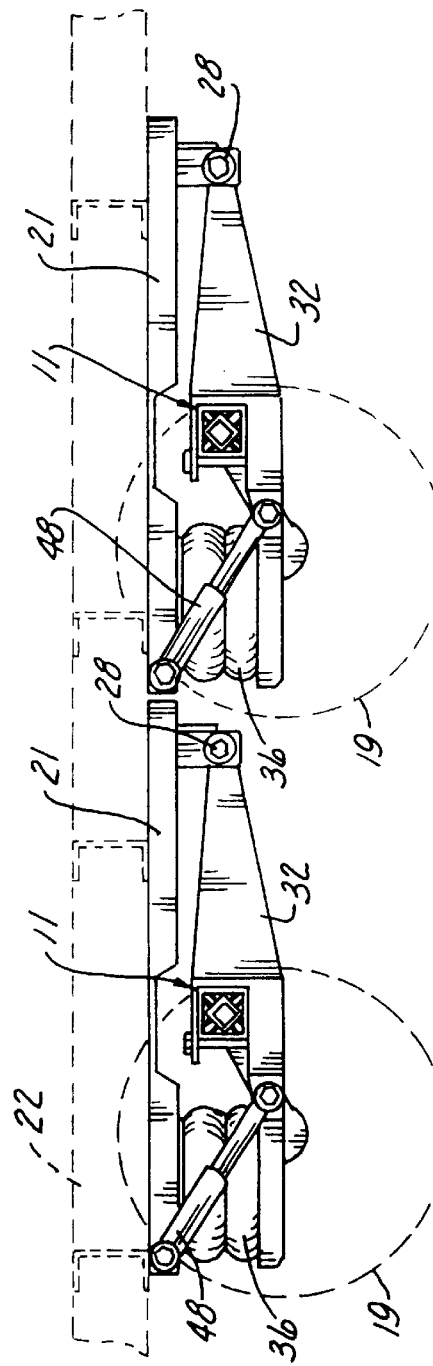
FIG. 4 shows how the present invention would be used on a trailer shown in dashed lines that had more than one wheel on each side thereof.
Figure 5:
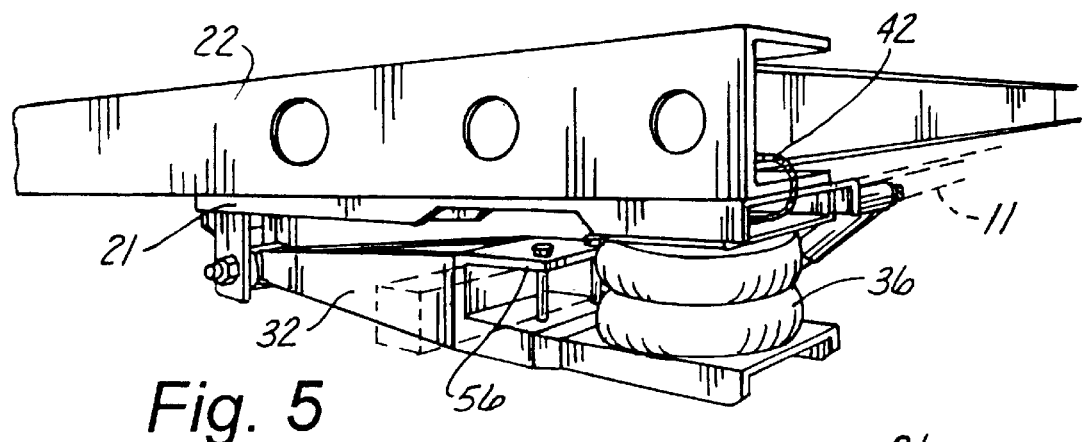
FIG. 5 is a perspective view from one side of a vehicle frame and showing a torsion axle in dashed lines.
Figure 6:
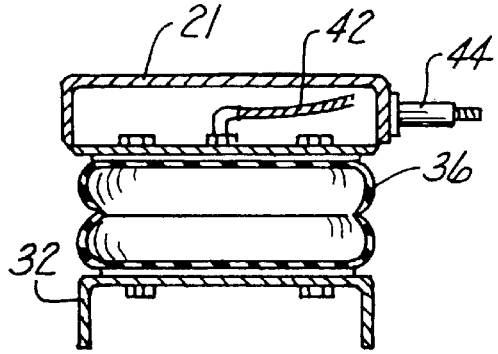
FIG. 6 is a cross sectional view taken along the line 6—6 of FIG. 3 and showing the air bag and an air line connected thereto.
Figure 8:
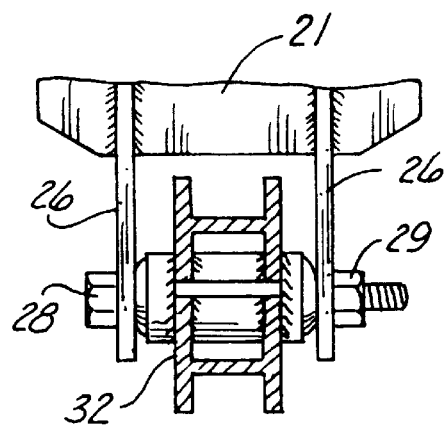
FIG. 8 is a cross sectional view taken along line 8—8 of FIG. 3.
Figure 7:
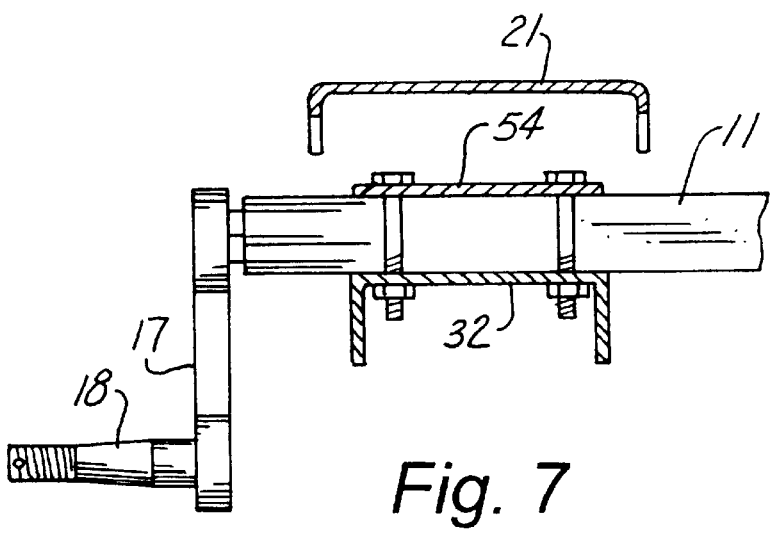
FIG. 7 is a cross sectional view taken along line 7—7 of FIG. 3 to show how the air bag assembly can be bolted to the torsion axle in one embodiment thereof.

The sub-assembly (10) has an attachment member (21) which can be bolted to the frame (22) of FIGS. 4 and 5 by bolts (23) through openings (24). The attachment member has downwardly depending flanges (26) with openings (27) therein for receiving a bolt (28) which is held in place by a nut (29) and washer (31).

Figure 2:
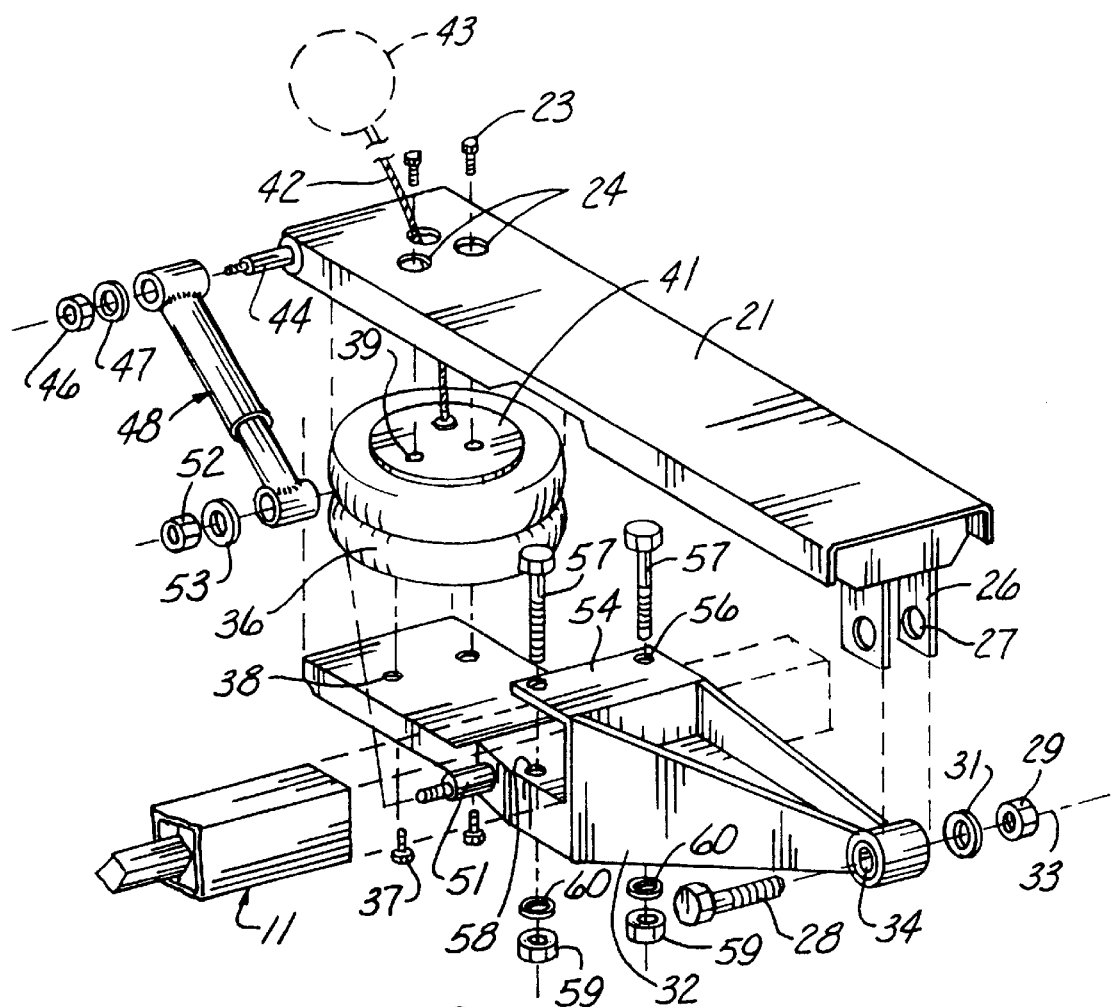
FIG. 2 is an exploded view of an air bag sub-assembly adapted to receive a torsion axle and showing in dashed lines a compressor for inflating the air bag and a control device to maintain or adjust the desired pressure within the air bag.

An arm (32) is pivotally attached to the attachment member (21) along axis (33) where bolt (28) passes through opening (34) and holes (27) in flanges (26). The arm (32) has an air bag (36) attached thereto by bolts (37) passing through openings (38) of the arm (32) and also by bolts (23) which not only attach to the frame (22) but to the holes (39) in the top plate (41) of the air bag (36). Also, an air hose (42) attaches to the plate (41) of the air bag (36) and leads to a combination air compressor and pressure controller (43) shown schematically in FIG. 2. A pin (44) which is threaded on the end to accept nut (46) and washer (47) allows a shock absorber (48) to be pivotally attached to the pin (44) and thereby to the attachment member (21) as best shown in FIG. 2. Similarly, a pin (51) is rigidly attached to the arm member (32) and is threaded on the end thereof to extend through the opening in the bottom of the adjustable link or shock absorber (48). It is held in place by a nut (52) and washer (53). It is to be understood that the shock absorber (48) could, instead of having liquid therein be of a pneumatic type or the adjustable link could even be an adjustable non shock absorbing device such as a chain.

The entire assembly (10) then is readily adapted to receive the torsion axle (11) by merely placing it in the slot formed by a flange (54) with openings (56) therein and bolts (57) which extend through openings (56) and (58) and these bolts (57) are held in place by a nut (59) and washer (60). The assembly (10) could, optionally, be welded to the torsion axle (11). While the air bag can be placed at other positions, it has been found to be preferable to be placed at a greater distance from the axis (33) than is the distance of the torsion axle (11) i.e., the torsion axle is disposed between the axis (33) and the air bag (36).

In operation, the frame (22) as shown in FIGS. 4 and 5, for example, could be a trailer, but could also be an automobile, a truck or other wheeled device. As the frame travels down the road and the tires (19) hit a bump or other irregularity such as a depression in the road, such tire (19) can independently move up or down or side-to-side to some extent by virtue of the normal action of the torsion axle (11). Aiding in making the suspension better however is the air bag (36) which would also especially smooth out the vertical changes in the ride of the vehicle frame (22) resulting in a smoother and better ride of the frame (22) over the road. The shock absorber (48) biases the arm member (32) to the position shown in FIG. 3 with respect to the attached member (21) and holds the assembly from pivoting too far apart and further prevents it from pivoting too close together when it hits a big shock or obstruction in the road.

Furthermore, referring to FIG. 2, the compressor and its associated controller (43), shown schematically in dashed lines, can be adjusted for different loads on the frame (22) or for different types of rides, depending upon the choice of the operator. With a heavy load, obviously more air is likely to be put into the air bag (36) and vice versa for a lighter load or no load at all.

Accordingly, it will be appreciated that the preferred embodiment does indeed accomplish the aforementioned objects. Obviously many modifications and variations of the present invention are possible in light of the above teachings. It is therefore to be understood that, within the scope of the appended claims, the invention may be practiced otherwise than as specifically described.

I claim:

1. A vehicle suspension system comprising:
   a frame;
   an arm operably pivotally attached to the frame along an axis;
   a torsion axle operably attached to said arm at a first distance spaced from said axis;
   an air bag operably attached at the top thereof to said frame and at the bottom thereof to said arm, said air bag being spaced at a second distance from said axis; and
   a linkage element of variable length operably attached to said frame and to said arm whereby said arm will be biased to a predetermined position with respect to said frame yet allow the arm to pivot about said axis.

2. The vehicle suspension system of claim 1 wherein said first and second distances are different distances.

3. The vehicle suspension system of claim 2 wherein said second distance is longer than said first distance.

4. The vehicle suspension system of claim 3 wherein said torsion axle having at least one elastomeric member wedged against a stub axle shaft having a longitudinal axis wherein said stub axle is biased to a first pivotal position about said longitudinal axis but can pivot to other positions when a wheel operatively attached to said stub axle hits a bump in a road.

5. The vehicle suspension system of claim 4 wherein there are at least two ground engaging wheels operatively rotatably attached to said torsion axle.

6. The vehicle suspension system of claim 1 wherein said torsion axle is an elastomeric torsion axle.

7. The vehicle suspension system of claim 6 wherein said elastomeric member is constructed of rubber and there are four of such elastomeric members disposed around said stub axle shafts.

8. The vehicle suspension system of claim 1 wherein said linkage member is a shock absorber.

9. The vehicle suspension system of claim 8 wherein said shock absorber is fluid operated.

10. The vehicle suspension system of claim 9 wherein said fluid is a liquid.

11. The vehicle suspension system of claim 1 having an attachment member attached to said frame, said linkage member being pivotally attached to said attachment member and to said arm.

12. The vehicle suspension system of claim 11 wherein said arm is operably pivotally attached to said attachment member.

13. The vehicle suspension system of claim 12 including threaded fasteners attaching said attachment member to said frame.

14. The vehicle suspension system of claim 1 wherein a top portion of said air bag is fixed with respect to said frame.

15. The vehicle suspension system of claim 1 wherein said arm is rigid.

16. A vehicle suspension system assembly for attachment to a vehicle frame having a torsion axle and two ground engaging wheels operatively rotatably attached to each respective end of said torsion axle, said assembly comprising:

an attachment member rigidly attached to the frame;

an arm operably pivotally attached to the attachment member along an axis;

a torsion axle receiving portion disposed on said attachments member a first distance spaced from said axis for selectively receiving a torsional axle;

an air bag operably disposed between the frame and said arm, said air bag being spaced at a second distance from said axis; and a linkage element of variable length operably attached to said frame and to said arm whereby said arm will be held at a predetermined position with respect to said frame yet allow the arm to pivot about said axis.

17. The vehicle suspension system assembly of claim 16 wherein said first and second distances are different distances.

18. The vehicle suspension system assembly of claim 17 wherein said second distance is longer than said first distance.

19. The vehicle suspension system assembly of claim 16 wherein said linkage member is a shock absorber.

20. The vehicle suspension system assembly of claim 19 wherein said shock absorber is fluid operated.

21. The vehicle suspension system assembly of claim 20 wherein said fluid is a liquid.

22. The vehicle suspension system assembly of claim 16 wherein said linkage member is attached to said attachment member and to said arm.

23. The vehicle suspension system assembly of claim 22 wherein said arm is operably pivotally attached to said attachment member.

24. The vehicle suspension system assembly of claim 23 including threaded fasteners attaching said attachment member to said frame.

25. The vehicle suspension system assembly of claim 1 including compressor means for pressurizing said air bag.

26. The vehicle suspension assembly of claim 16 wherein the air bag is operatively attached at the top end thereof to said attachment member.

27. The vehicle suspension assembly of claim 26 wherein said attachment member includes a one piece member extending from a point over said axis to a point over said air bag.

28. The vehicle suspension system of claim 16 wherein a top portion of said air bag is fixed with respect to said frame.

29. The vehicle suspension system of claim 16 wherein said arm is rigid.

* * * * *